(12) United States Patent
Gschwind et al.

(10) Patent No.: US 8,127,078 B2
(45) Date of Patent: Feb. 28, 2012

(54) HIGH PERFORMANCE UNALIGNED CACHE ACCESS

(75) Inventors: Michael K. Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/572,416

(22) Filed: Oct. 2, 2009

(65) Prior Publication Data
US 2011/0082980 A1    Apr. 7, 2011

(51) Int. Cl.
*G06F 12/00* (2006.01)
(52) U.S. Cl. .......................................................... 711/118
(58) Field of Classification Search .................. None
See application file for complete search history.

(56) References Cited

U.S. PATENT DOCUMENTS

| | | | | |
|---|---|---|---|---|
| 5,414,824 | A | 5/1995 | Grochowski | 395/400 |
| 5,499,204 | A | 3/1996 | Barrera | 365/49 |
| 5,974,497 | A | 10/1999 | Teshome | 710/129 |
| 6,085,289 | A | 7/2000 | Thatcher | 711/118 |
| 6,112,297 | A | 8/2000 | Ray | 712/225 |
| 6,226,707 | B1 | 5/2001 | Mattela | 711/3 |
| 6,539,467 | B1 | 3/2003 | Anderson | 711/219 |
| 6,915,385 | B1 | 7/2005 | Leasure | 711/127 |
| 7,366,819 | B2 | 4/2008 | Oberlaender | 711/3 |
| 2006/0112235 | A1* | 5/2006 | Cabot et al. | 711/141 |
| 2007/0011441 | A1* | 1/2007 | Eichenberger et al. | 712/221 |
| 2008/0010433 | A1 | 1/2008 | Fluhr et al. | 711/206 |

FOREIGN PATENT DOCUMENTS
EP    0365281    4/1990
* cited by examiner

*Primary Examiner* — Hiep Nguyen
(74) *Attorney, Agent, or Firm* — Ido Tuchman; William J. Stock

(57) ABSTRACT

A cache memory device and method for operating the same. One embodiment of the cache memory device includes an address decoder decoding a memory address and selecting a target cache line. A first cache array is configured to output a first cache entry associated with the target cache line, and a second cache array coupled to an alignment unit is configured to output a second cache entry associated with the alignment cache line. The alignment unit coupled to the address decoder selects either the target cache line or a neighbor cache line proximate the target cache line as an alignment cache line output. Selection of either the target cache line or a neighbor cache line is based on an alignment bit in the memory address. A tag array cache is split into even and odd cache lines tags, and provides one or two tags for every cache access.

25 Claims, 12 Drawing Sheets

HIGH PERFORMANCE UNALIGNED CACHE ACCESS

BACKGROUND OF THE INVENTION

1. Field of the Invention

The present invention relates to the field of computer memory, and more particularly to cache memory.

2. Description of Background

Unaligned data access is when requested data spans across multiple cache lines in a cache memory device. Traditionally, when data are not aligned to fit in a single cache-line, two separate loads, and logic for extracting and merging requested data from two cache lines is typically required. A large number of unaligned accesses can degrade the performance of a processor core.

Frequently, a compiler cannot determine ahead of time a data address that avoids spanning multiple cache lines. To access data which crosses over two cache lines, the two cache lines need to be accessed, and the data have to be merged. This can be accomplished with several different techniques:

1. Sequentially, e.g., using microcode: In this approach, when an unaligned data access is detected, a microcode sequence is initiated. The request is translated into two consecutive load requests, and data are then assembled. The fact that data is unaligned is known only after the data address is computed, thus requiring flush and replay. While the performance penalty of this approach is much lower than invoking an exception, this solution is slow and requires many cycles for completion. This solution is used in Power4 microprocessor architecture and other Power architectures (P5, K4, P7).

2. In parallel, e.g., using multi-port caches: This approach uses multiport caches, and it can access two lines and merge data. While very fast, it doubles the number of required cache ports, and is power inefficient, as two cache lines are accessed for all cache accesses, independently if data are spanning multiple cache lines or not, as the spanning condition is only known after address compute. This has consequences for compilers, which need to provide code for handling unaligned data with minimal performance penalty.

Unaligned cache access is especially pronounced for Single Instruction, Multiple Data (SIMD) code, where several vector elements are accessed and processed in parallel. To minimize performance penalty when handling unaligned data for SIMD operations, a shuffle instruction can be used to shuffle data based on their alignment. This introduces a small performance penalty for each SIMD load, independently if data is aligned or not, as a shuffle instruction has to be executed every time. If the architecture does not support a data shuffle instruction, a compiler needs to have code versioning to separately handle aligned and unaligned data (for example, to generate scalar instructions for unaligned data, and SIMD code for aligned data, a condition detected at the run time).

SUMMARY OF THE INVENTION

One aspect of the invention is a cache memory device. The cache memory device includes an address decoder configured to decode line index bits in a memory address and select a target cache line from a plurality of cache lines. A first cache array and a second cache array are coupled to the address decoder. The first cache array is configured to output a first cache entry associated with the target cache line. The second cache array is configured to output a second cache entry associated with an alignment cache line. An alignment unit is coupled to the address decoder and is configured to select either the target cache line or a neighbor cache line proximate the target cache line in the second array as output to the alignment cache line. The selection of either the target cache line or a neighbor cache line is based on an alignment bit in the memory address. A tag selector is configured to output at least one target cache tag entry associated with the target cache line and, if bits in the memory address indicate a neighbor cache line is selected by the alignment unit and the neighbor cache lines contains data addressed by byte offset bits in the data address, to output a neighbor cache tag associated with the neighbor cache line.

The cache memory device may include a tag decoder configured to decode at least some of the line index bits in the memory address and select a target tag line from a plurality of tag lines. A first tag array is coupled to the tag decoder and is configured to output a tag entry associated with the even target cache line of the cache array. A second tag array is also coupled to the tag decoder and is configured to output a tag entry associated with the odd target cache line of the cache array.

Another aspect of the invention includes a method for operating a cache memory device. The method includes a selecting operation for selecting a target cache line from a plurality of cache lines based on decoded line index bits in a memory address. A retrieving operation retrieves a first cache entry associated with the target cache line from a first cache half-line array. Another retrieving operation retrieves a second cache entry associated with the cache line from a second cache half-line array. Another selecting operation selects either the target cache line or a neighbor cache line proximate the target cache line as output to an alignment cache line. The selection of the target cache half-line, and either the target cache half-line or a neighbor cache half-line is based on an alignment bit in the memory address. A first outputting step outputs at least one target cache tag entry associated with the target cache line. If bits in the memory address indicate a neighbor cache line is selected and the neighbor cache line contains data addressed by byte offset bits in the data address, a second outputting step outputs a neighbor cache tag associated with the neighbor cache line.

The method may further include an additional selecting operation for selecting a target tag line from a plurality of tag lines based on at least some of the line index bits in the memory address. A first buffering operation buffers an even tag entry associated with the even target cache lines of the cache array. Likewise, a second buffering operation buffers an odd tag entry associated with the odd cache lines of the cache array.

A further aspect of the invention is a system for operating a cache memory device. The system includes means for selecting a target cache line from a plurality of cache lines based on decoded line index bits in a memory address; means for retrieving a first cache entry associated with the target cache line from a first cache array; means for selecting either the target cache line or a neighbor cache line proximate the target cache line from the plurality of cache lines as an alignment cache line output based on decoded line index bits in a memory address, selection of either the target cache line or the neighbor cache line being based on an alignment bit in the memory address; means for retrieving a second cache entry associated with the alignment cache line from a second cache array; means for outputting at least one target cache tag entry associated with the target cache line; and means for outputting a neighbor cache tag associated with the neighbor cache line if bits in the memory address indicate a neighbor cache line is selected and the neighbor cache line contains data addressed by byte offset bits in the data address.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-12.

Figure 1:
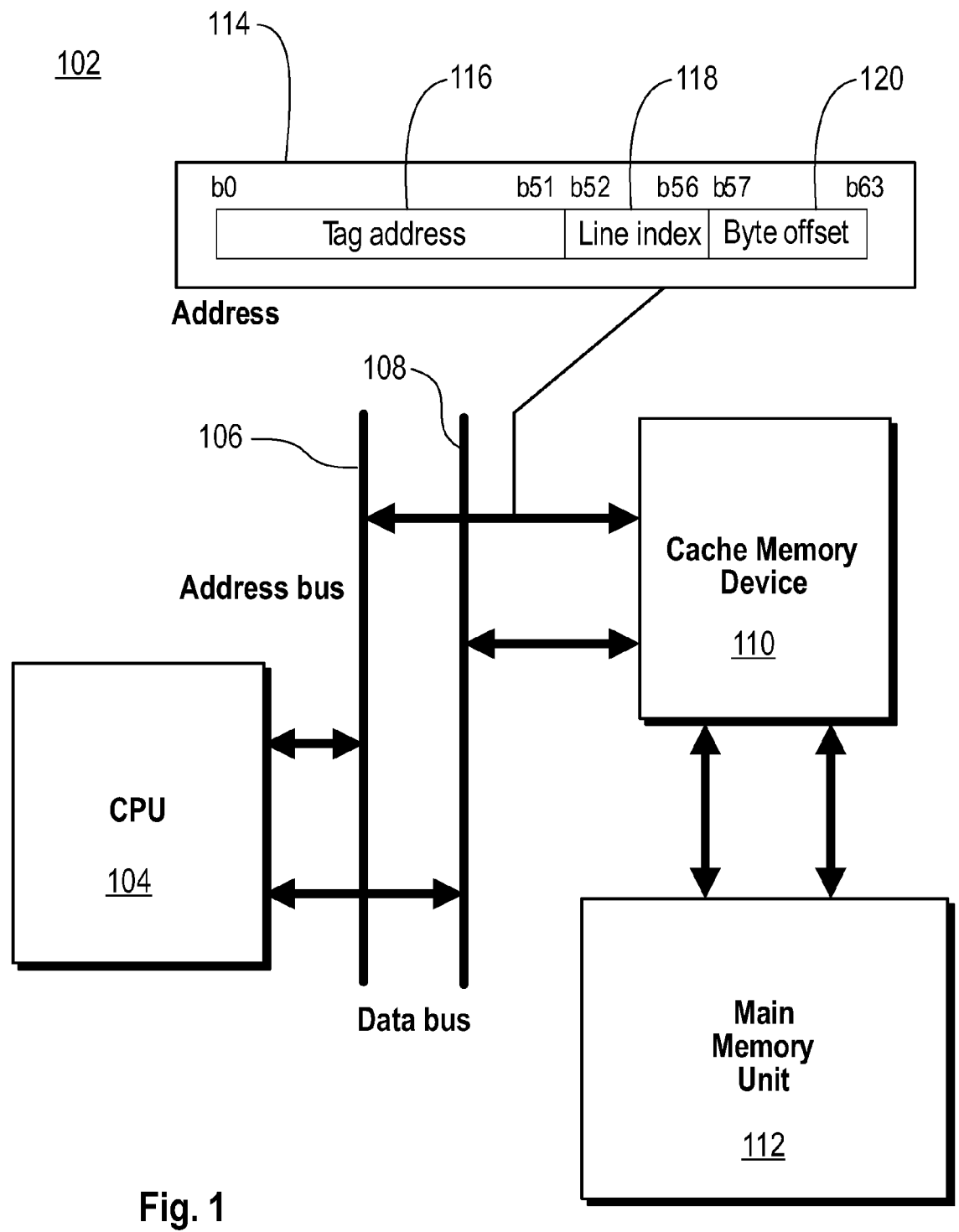
FIG. 1 shows an example system environment contemplated by the present invention.

Turning to FIG. 1, an example system environment 102 contemplated by the present invention is shown. The environment 102 includes one or more central processing units 104 coupled to an address bus 106 and a data bus 108. A cache memory device 110 is also coupled to the address bus 106 and the data bus 118.

The CPU 104 requests data stored in cache memory by issuing a data address 114 on the address bus 106. The cache memory device 110 reads the data address 114 and checks if the requested data is stored in its memory. If the requested data is stored in the cache, it is referred to as a cache hit. During a cache hit, the cache memory device 110 returns the requested data to the CPU 104 via the data bus 108.

On the other hand, if the requested data is not stored within the cache memory device 110, it is referred to as a cache miss. When a cache miss occurs, the CPU 104 accesses the slower main memory unit 112 for the requested data.

In the example system 102, the data address is 64 bits wide (bits b0 through b63). As discussed in detail below, the cache memory device 110 divides the address 114 into a tag address 116 (bits b0 through b51), a line index 118 (bits b52 through b56) and a byte offset 120 (bits b57 through b63). Typically, the tag address 118 is used to determine if data for the request address is stored in the cache device 110. The line index 118 is used to access the correct cache line storing the requested data. Finally, the byte offset 120 is used to select a portion of the line data containing the requested data. The address arrangement shown is just one example of a configuration that can be employed by the cache memory device 110. It is contemplated that may different address arrangements may be employed by the cache memory device 110 without departing from the scope and spirit of the invention.

Those skilled in the art will recognize that the system environment 102 shown is greatly simplified to focus on important features of the present invention. A typical system environment 102 embodying the present invention is much more complex. However, the details of such a typical system are not central to the present invention. For a comprehensive discussion of computer architecture, including cache memory, the reader is referred to *Computer Architecture: A Quantitative Approach, 4th Edition*, by John L. Hennessy and David A. Patterson (published by Morgan Kaufmann), the content of which is incorporated herein by reference in its entirety.

Figure 2:
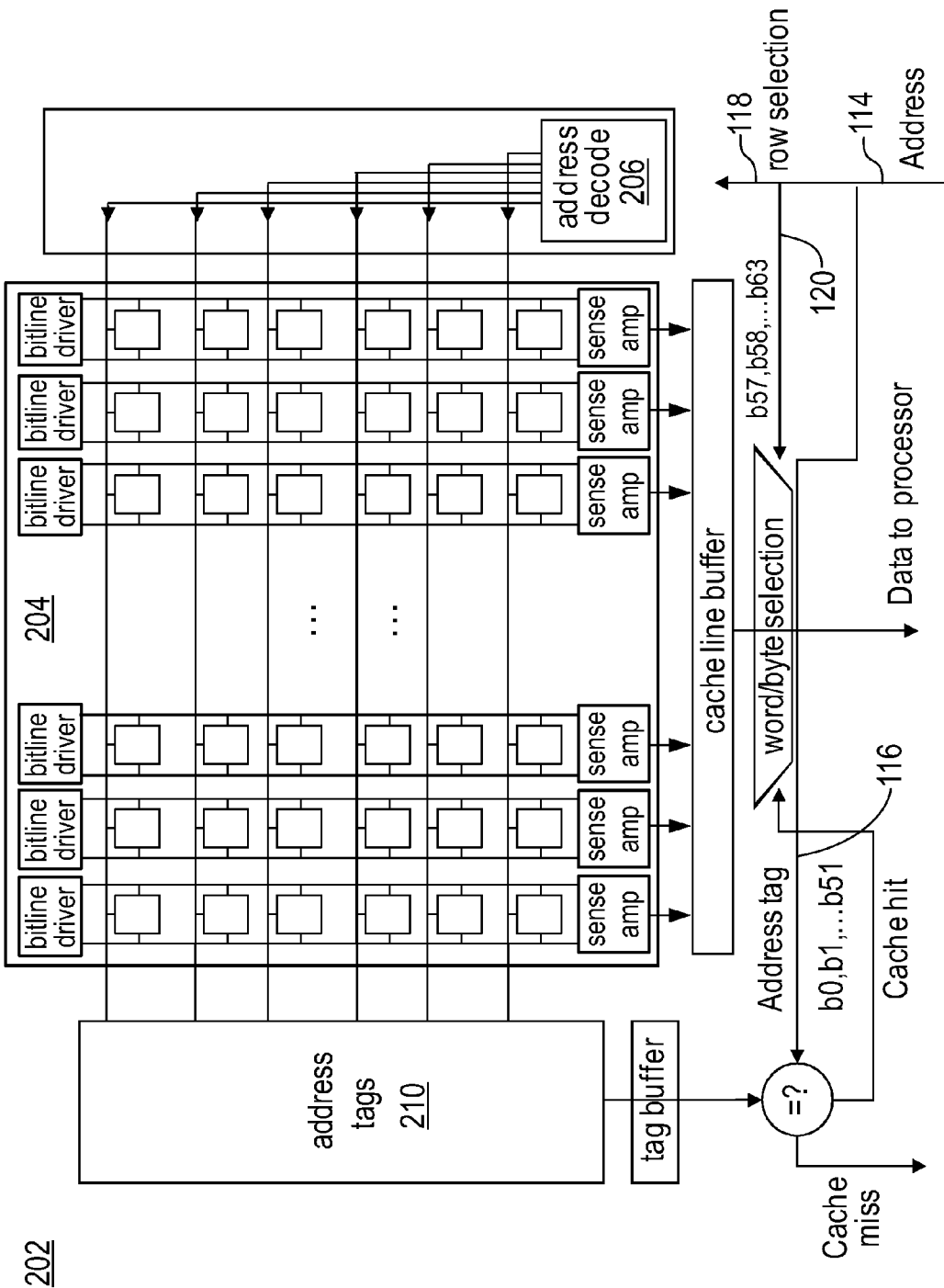
FIG. 2 shows an example prior art cache memory device.

Referring now to FIG. 2, a typical prior art cache memory device is shown. The cache memory device 202 includes a cache array 204, an address decoder 206 coupled to the address bus 106, and a cache tag array 210. The address decoder 206 decodes line index bits 118 in the memory address 114 and selects a target cache line from a plurality of cache lines. The cache array 204 is coupled to the address decoder 206, and outputs a cache entry associated with the target cache line. The cache tag array 210 selects a target cache tag associated with the target cache line. The selected tag value is compared to the tag address bits 116 of the address 114. If the tags match, then the data selected in the cache are the requested data. From the cache line read out in the cache line buffer is selected data starting at the byte offset 120, and are sent back to the processor.

Figure 3:
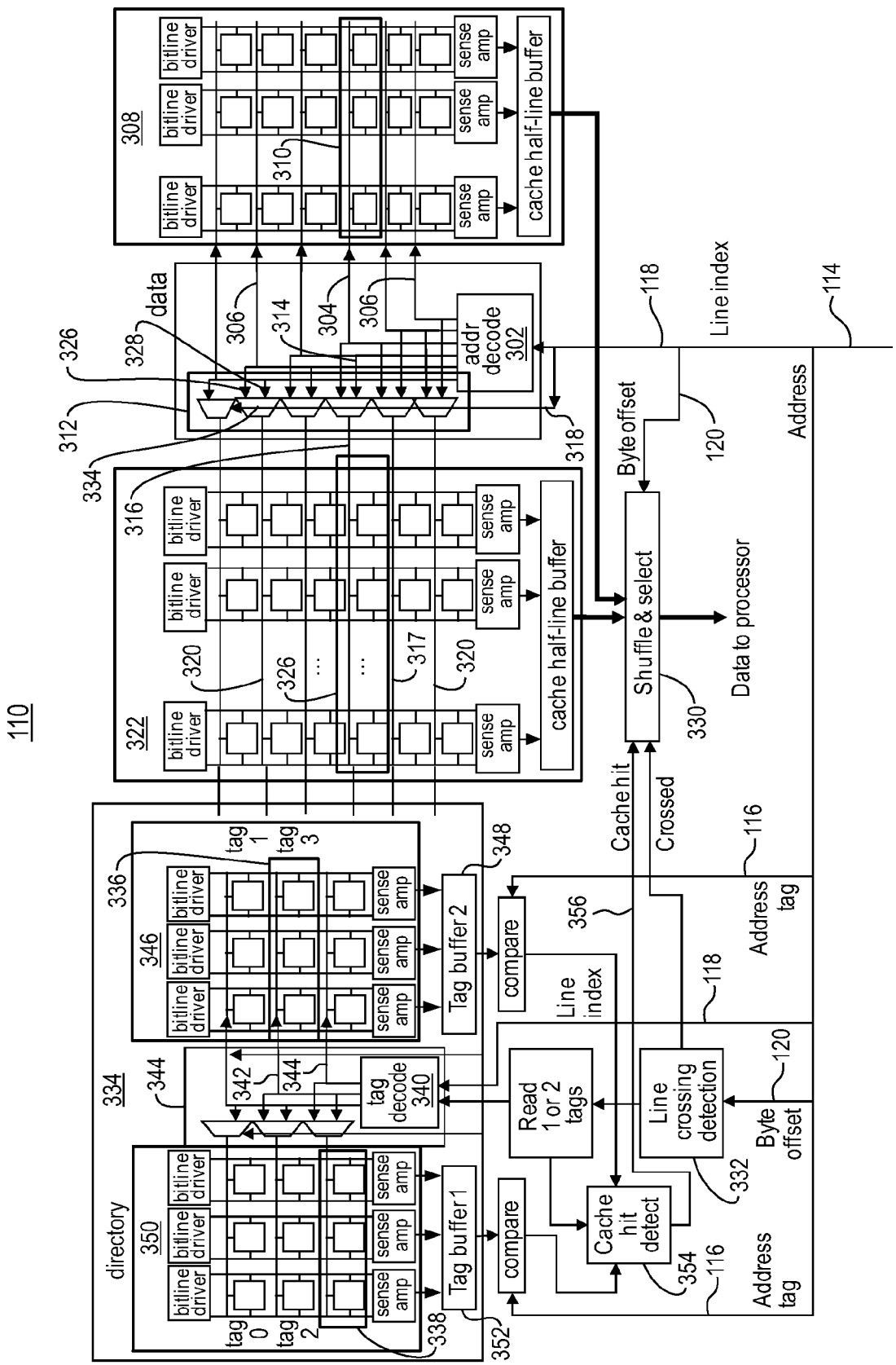
FIG. 3 shows an example cache memory device contemplated by the present invention.

Turning now to FIG. 3, an example cache memory device 110 contemplated by the present invention is shown. The cache memory device 110 includes an address decoder 302 coupled to the address bus 106. The address decoder 302 decodes line index bits 118 in the memory address and is configured to select a target cache line 304 from a plurality of cache lines 306.

A first cache array 308 is coupled to the address decoder 302 through the cache line 306. The first cache array 308 is configured to output a first cache entry 310 associated with the target cache line 304.

The cache memory device 110 includes a second cache array 322 coupled to the address decoder 302 via an alignment unit 312 and a plurality of alignment lines 320. The second cache array 322 is configured to output a second cache entry 326 associated with a selected alignment cache line 316.

The cache memory device 110 includes an alignment unit 312 coupled to the address decoder 302 via the cache lines 306. The alignment unit 312 is configured to select either the target cache line 316 or a neighbor cache line 317 proximate the target cache line. Selection of either the target cache line 304 or the neighbor cache line 317 is based on an alignment bit 318 in the memory address 114. It is noted that as used herein, bit or bits in the memory address refers to the values contained therein. For example, selection of cache lines based on an alignment bit in the memory address refers to the binary value appearing at the alignment bit of the received memory address.

In a particular embodiment of the cache memory device 110, the neighbor cache line 317 is the cache line associated with the received memory address at the address decoder 302 incremented by one. Furthermore, the alignment bit 318 may be the most significant bit of the byte offset bits 120. In the example address arrangement discussed in FIG. 1, the alignment bit 318 would therefore be bit 57.

In one embodiment of the invention, the alignment unit 312 includes a plurality of multiplexers 324 receiving a first cache line 326 associated with a first address and a second cache line 328 associated with a second address. The first and second addresses may each be the line index portion of a memory address. Furthermore, the second cache line 328 may be the cache line associated with first address incremented by one. Each of the plurality of multiplexers 324 also receives the alignment bit 318 as a selection input which selects as output either the first cache line 326 or the second cache line 328.

In one embodiment of the invention, the first cache entry 310 and the second cache entry 326 are equal in bit width. The first cache array 308 and the second cache array 322 are each half-line wide.

The cache memory device 110 may further include a shuffle unit 330 coupled to the first cache array 308 and the second cache array 322. The shuffle unit 330 is configured to swap bit locations of the first cache entry 310 and the second cache entry 326 in a shuffle buffer if the alignment bit 318 in the memory address 114 indicates the neighbor cache line 317 is selected by the alignment unit 312. The shuffle unit 330 may include a word selector configured to output a portion of data stored in the shuffle buffer 330 corresponding to byte offset bits 120 in the memory address 114.

The cache memory device 110 may include a line crossing detector 332 coupled to the shuffle unit 330. The line crossing detector 332 is configured to determine if relevant cache data is stored in both the first cache array 308 and the second cache array 322 based, at least in part, on byte offset bits 120 in the memory address 114.

The cache memory device 110 may include a tag selector 334 configured to output at least one target cache tag entry 336 associated with the target cache line 304. The tag selector 334 is further configured to output a neighbor cache tag 338 associated with the neighbor cache line 317 if the alignment bit 318 in the memory address 114 indicates the neighbor cache line 317 is selected by the alignment unit 312.

In one embodiment of the invention, the tag selector 334 includes a tag decoder 340. The tag decoder 340 is configured to decode at least some of the line index bits 118 in the memory address 114 and select a target tag line 342 from a plurality of tag lines 344. A first tag array 346 is coupled to the tag decoder 340. The first tag array 346 is configured to output an even tag entry 348 associated with the even target cache lines of the cache arrays 308 and 322. A second tag array 350 is also coupled to the tag decoder 340. The second tag array 350 is configured to output an odd tag entry 352 associated with the odd cache lines of the cache arrays 308 and 322.

The cache memory device 110 may include a cache hit detector 354. The cache hit detector 354 is configured to indicate a cache hit 356 if the first tag entry 348 matches address tag bits 116 in the memory address 114, the second tag entry 352 matches the address tag bit 116 in the memory address 114, the line crossing detector 120 determines relevant cache data is stored in both the first cache array 308 and the second cache array 322, and the cache line is crossed.

The example embodiment of FIG. 2 beneficially supports handling unaligned data accesses by splitting each cache line into two half cache lines. The cache device 110 can handle data accesses smaller or equal to the half cache lines 306 and 320 without performance penalty, and without significant increase in hardware complexity, or power consumption. This device 110 does not require increase of tag array for a given cache, increase of ports to the cache array or to the cache tag arrays, or increase of buffers for holding data.

The cache is split in half vertically, where each cache line spans across left (L) and right (R) half cache lines 320 and 306. The address decoder 302 receives the address 118, and encodes the target select line 304 from the plurality of cache lines 306, and one of the target select lines 316 or 317 from the plurality of the cache lines 320 is selected depending on the value of the bit 318. The target select line signal determines selected cache half-lines (wordline) for the two cache halfs 322 and 308.

In the example device 110, the target select line 304 powers not only L and R of the target select line, but also L line of the (target select+1) line. The selection of the cache line to be buffered is then performed with the alignment bit 318 which selects the correct L cache half-line: this is determined by the request address, if it starts in the left (L) or right (R) half of the cache line. The data are then buffered from the R half-line, and one of the L half lines of select and select+1 is read out. Which two half lines are accessed depends if data requested crosses the cache line. Then, corresponding cache half-lines are accessed, i.e., either line or next line for first half-line is selected.

In a particular embodiment, the cache is split into half vertically into a first (right) cache array 308 and a second (left) cache array 322. Each cache line spans across left (L) and right (R) half cache lines. The address decoder 302 receives the line index bits 118 in the memory address 114, and decodes the target select line 304 for a single cache line.

The address decoder 302 determines if the data starts in the L or R cache half-line. There may be one alignment bit in the address which determines L or R half line.

If the address starts in the L cache half-line, both the L and R cache half lines for the target cache line are selected and accessed. The target cache line to select is determined by a number of consecutive bits in the address. In one embodiment, these consecutive bits are the line index bits 118 in the memory address 114.

However, if the address starts in the R cache half line, the R cache half line for the cache line select is accessed, and L cache half line for the line select+1 is accessed.

Figure 4:
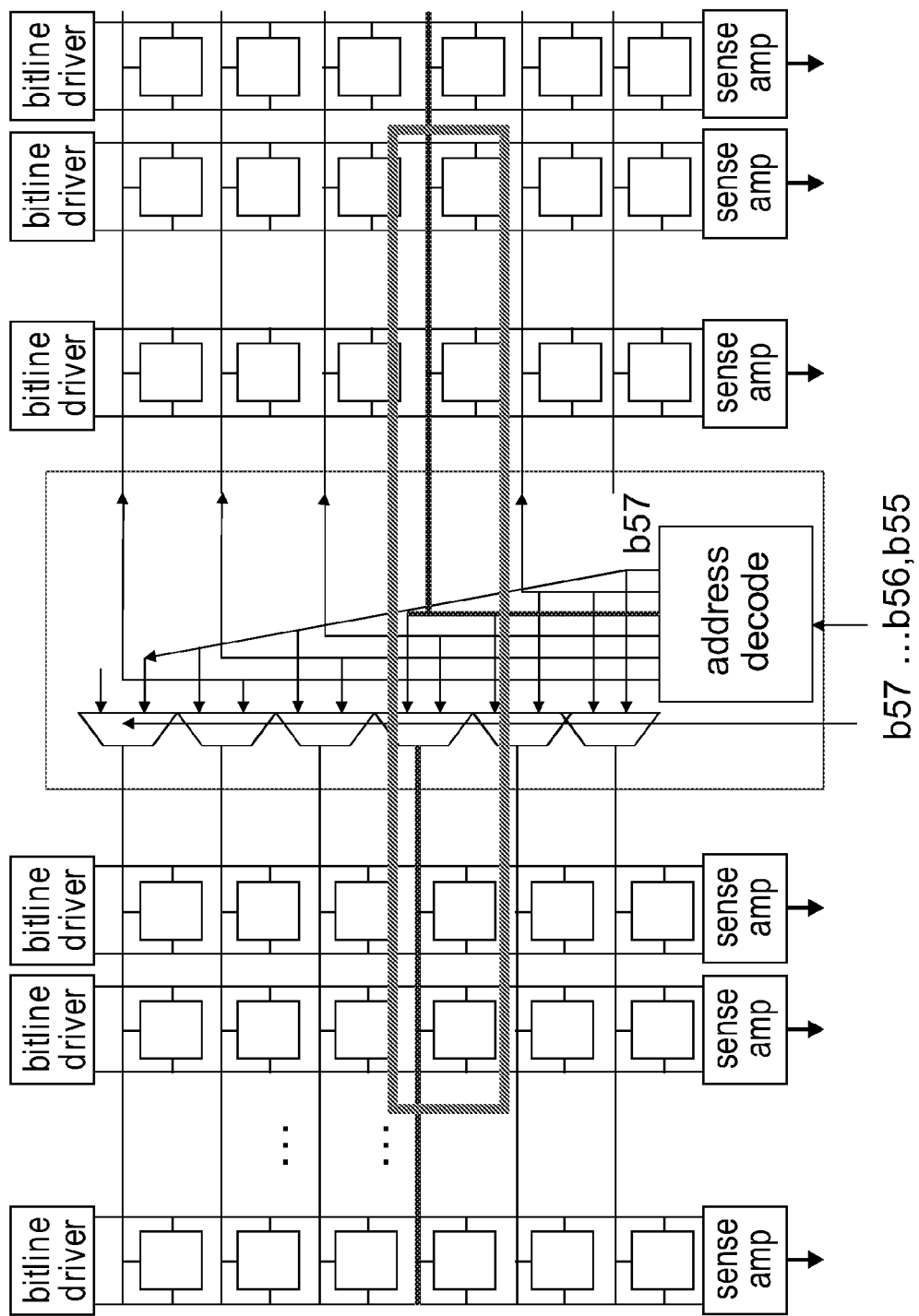
FIG. 4 illustrates cache data access contained within a single cache line.

Consider, for example, a 32K byte cache 8-way set associative with a 128 byte cache line size. In this configuration, address bit b57 (the alignment bit) determines L or R cache half-line. This cache has 32 cache lines. Which cache line to select is determined by address bits b52 to b56 (the line index bits). If the address is in the L (b57=0), data which are up to the size of a half cache line will be contained within a single cache line. The logic needs to access the select lines both left and right cache half-lines L+R. This access is illustrated in FIG. 4.

Figure 5:
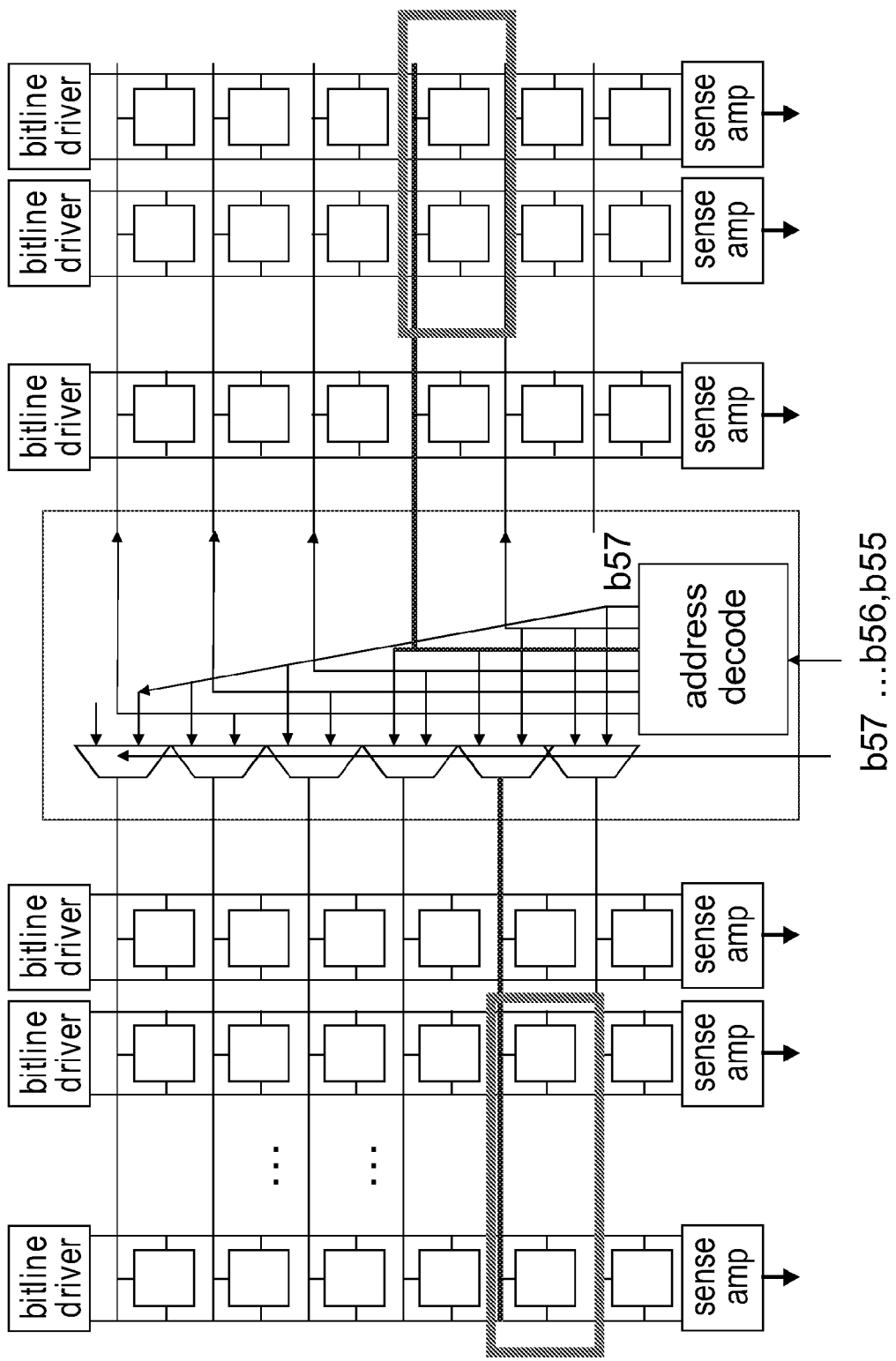
FIG. 5 illustrates cache data access straddled between two cache lines.

In the case when data straddle between two cache lines occurs, the starting address of data will be in the right cache half-line R (b57=1). The logic needs to access the select lines on the right cache half-line R for the line select, and left cache half-lines L for the consecutive cache line select+1. This access is illustrated in FIG. 5.

It is noted that the logic may need to check up to two tags for each cache line access. If data are contained within line i, then only tag for the line i needs to be checked. If data are straddling lines i and i+1, then both tags for lines i and i+1 need to be checked.

It is important to note that the number of total cache tags does not change example embodiments of the present invention. Embodiments may provide capability to read out and compare two tags in parallel. How this can be implemented without adding a second read port to a cache tag array is described below.

In an example cache architecture with a cache vertically split into two half-line cache arrays, up to two cache tags need to be read out and checked for each access. If data are contained within one cache line, then only one cache tag for that cache line needs to be read out and checked. If, however, data are straddling lines i and i+1, then tags for both lines i and i+1 need to be accessed and checked.

To be able to read up to two cache tags, it is contemplated that in one embodiment of the invention, a second read port on the cache tag array is added. However, adding a second read port results in a larger and less efficient implementation. Thus, the challenge is to avoid adding the second read port to the cache tag array.

Figure 6:
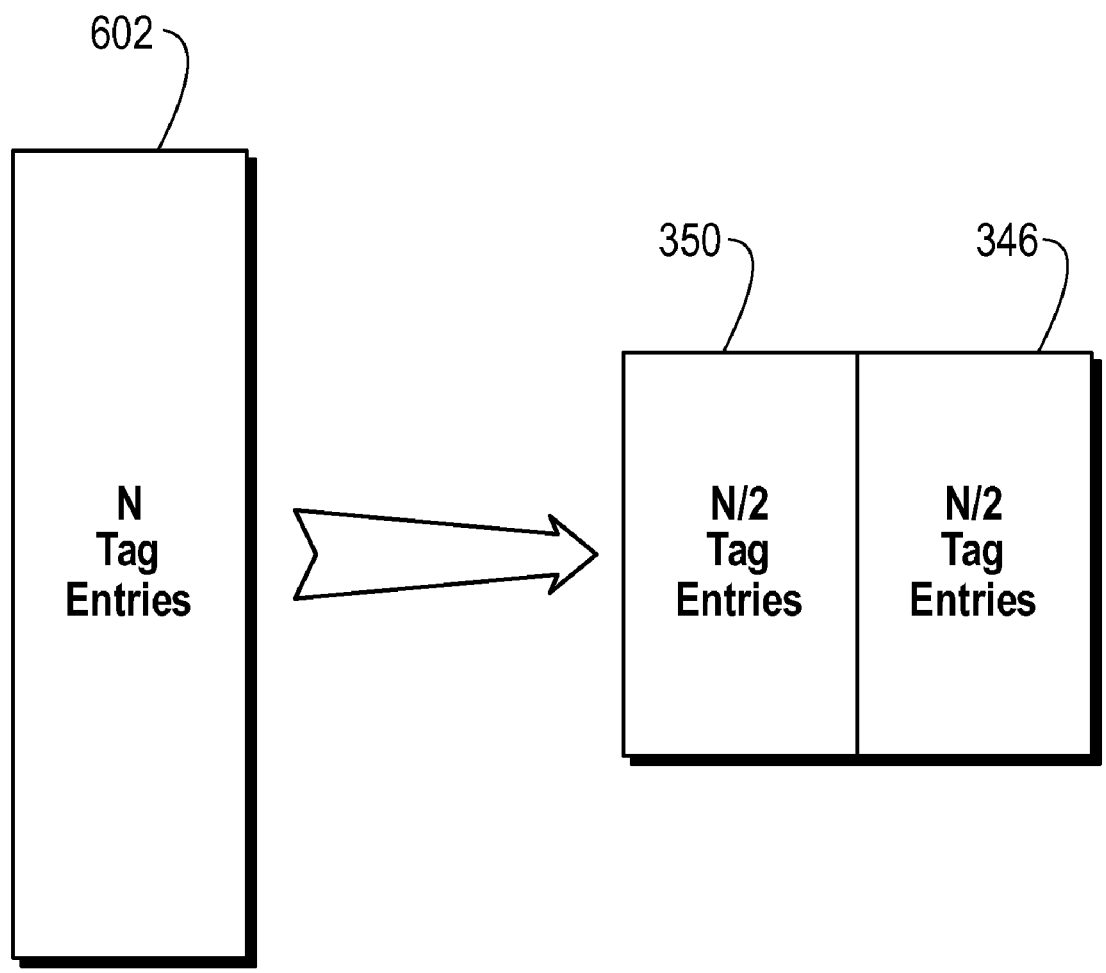
FIG. 6 shows an example embodiment of the invention which splits the tag array into two arrays.

To avoid two read ports on tag array, another embodiment of the invention splits the tag array into two arrays, as shown in FIG. 6. The tag entries 602 are split such that all tags for odd cache lines are in a first tag array 346, and all tags for even cache lines are in a second tag array 350. This configuration does not increase the total number of tags maintained, nor increases the number of ports to the tag arrays.

For the same-line data accesses, only one cache tag is accessed and compared. For data straddling two cache lines, two line tags need to be accessed and compared. Since data will be in two consecutive cache lines, two consecutive tags from one even and one odd tag array need to be checked, reading only one tag per each tag array.

For example, in the example cache, bit b56 determine now if a selected cache line is even (b56 equals 0), or it is odd (b56 equals 1). Thus, in the case when no data straddle is detected, if b56 equals 0 only tag A (the second tag array 350 or even tag array) needs to be compared, whereas if b56 equals 1 only tag B (the first tag array 346 or odd tag array) will be compared.

In the case when data straddle is detected two tags need to be compared: if b56 equals 0, tags A (i) and B (i+1) need to be read out and compared, whereas for b56 equal to 1, tags B (i) and A (i+1) will be compared. In the case when data straddle two cache lines, two cache tags are compared, and both tags need to have the same value for a cache hit.

Figure 7:
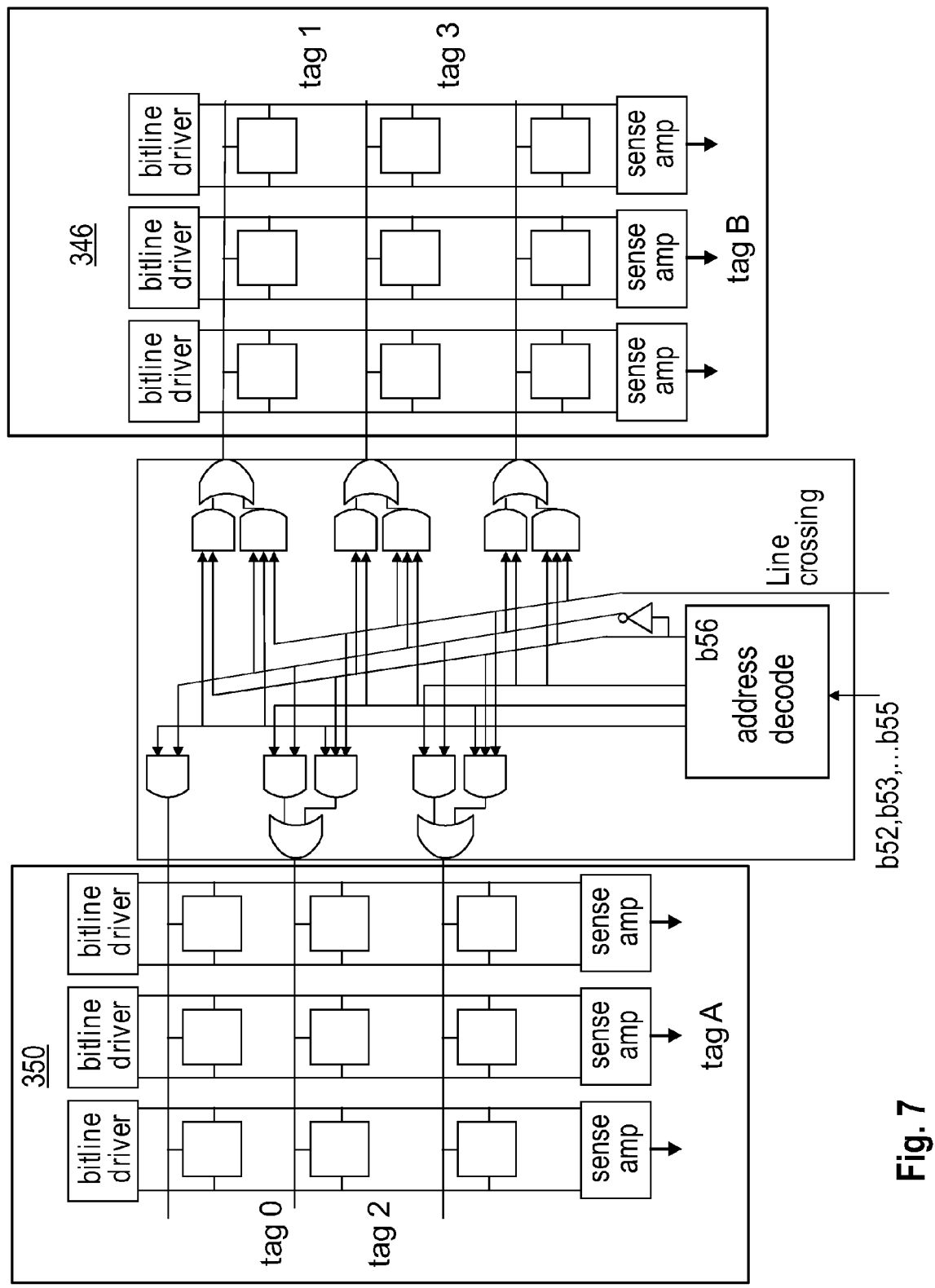
FIG. 7 shows an example cache tag array split into a first tag array for odd cache tags and a second tag array for even cache tags.

FIG. 7 illustrates the cache tag array split into two separate tag arrays, a first tag array 346 for odd cache tags and a second tag array 350 for even cache tags. This configuration uses the same structure for storing cache tag arrays as for splitting the cache data array vertically. For the cache tag configuration, bit b56 determines which two cache tags will be read out in the same way the alignment bit 318 is used for reading cache data. Finally, for comparison logic, the straddle data condition determines if one or two tags have to be checked to determine cache hit.

Figure 8:
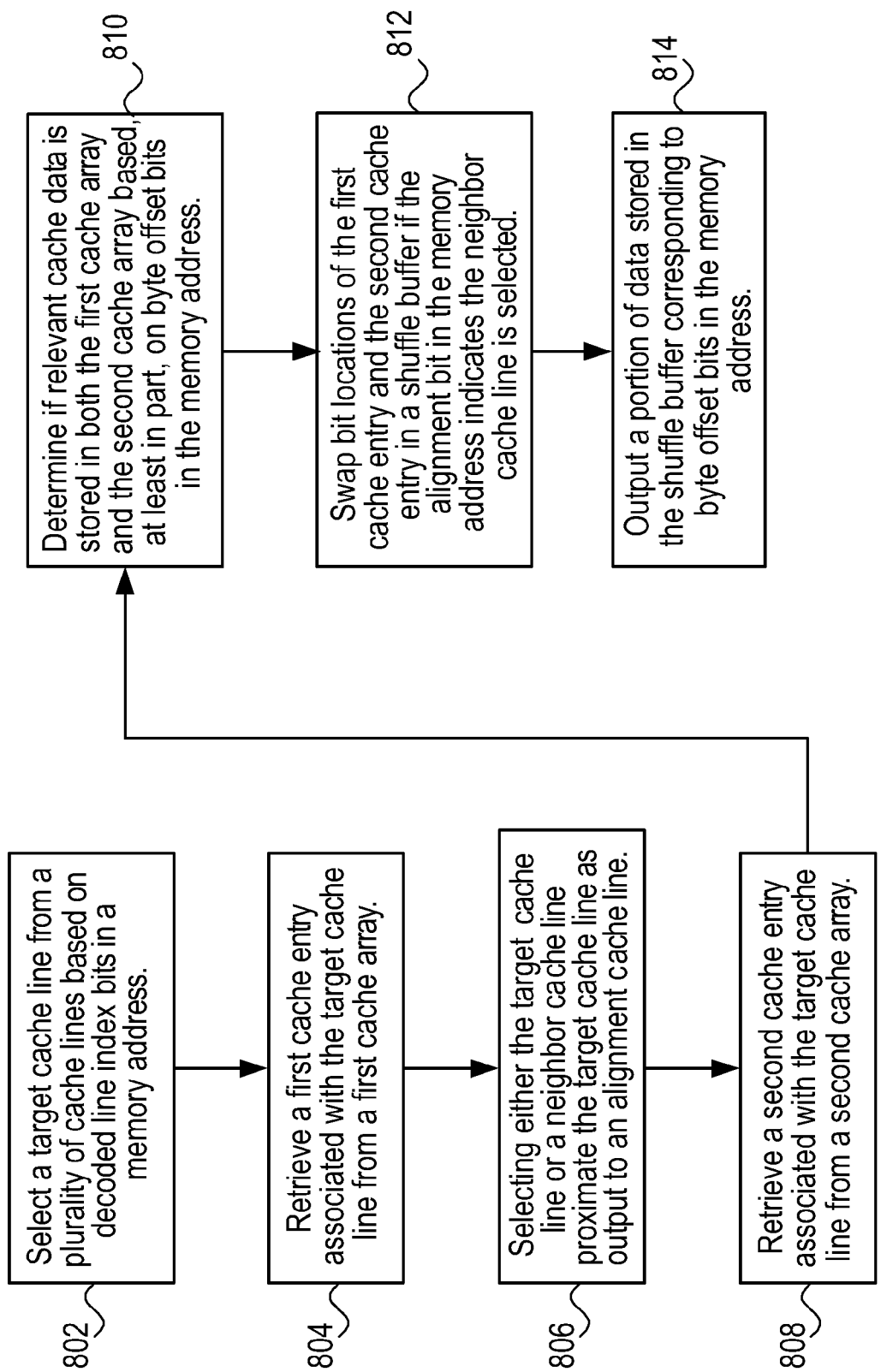
FIGS. 8-12 show example flowcharts for operating a cache memory device contemplated by the present invention.

Turning now to FIG. 8, an example method for operating a cache memory device contemplated by the present invention is shown. Those skilled in the art will recognize that the operations may be carried out in hardware and software (including firmware, resident software, micro-code, etc.), depending on performance requirements. The software and/or hardware aspects of the invention may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

At selecting operation 802, a target cache line is selected from a plurality of cache lines based on decoded line index bits in a memory address. Next, at retrieving operation 804, a first cache entry associated with the target cache line is retrieved from a first cache array. After retrieving operation 804 is completed, control passes to selecting operation 806.

At selecting operation 806, either the target cache line or a neighbor cache line proximate the target cache line is selected as output to an alignment cache line. Selection of either the target cache line or a neighbor cache line being based on an alignment bit in the memory address. After selecting operation 806 is completed, control passes to retrieving operation 808.

At retrieving operation 808, a second cache entry associated with the alignment cache line is retrieved from a second cache array. As discussed above, the neighbor cache line may be the cache line associated with the memory address, or the memory address incremented by one. Furthermore, the first cache entry and the second cache entry may be of equal in bit width. After retrieving operation 808 is completed, control passes to determining operation 810.

At determining operation 810, a determination is made whether relevant cache data is stored in both the first cache array and the second cache array. This determination is based, at least in part, on byte offset bits in the memory address.

The method may further include swapping operation 812. During this operation, bit locations of the first cache entry and the second cache entry in a shuffle buffer are swapped if the alignment bit in the memory address indicates the neighbor cache line is selected.

At outputting operation 814, a portion of data stored in the shuffle buffer corresponding to byte offset bits in the memory address is output to the data bus.

Figure 9:
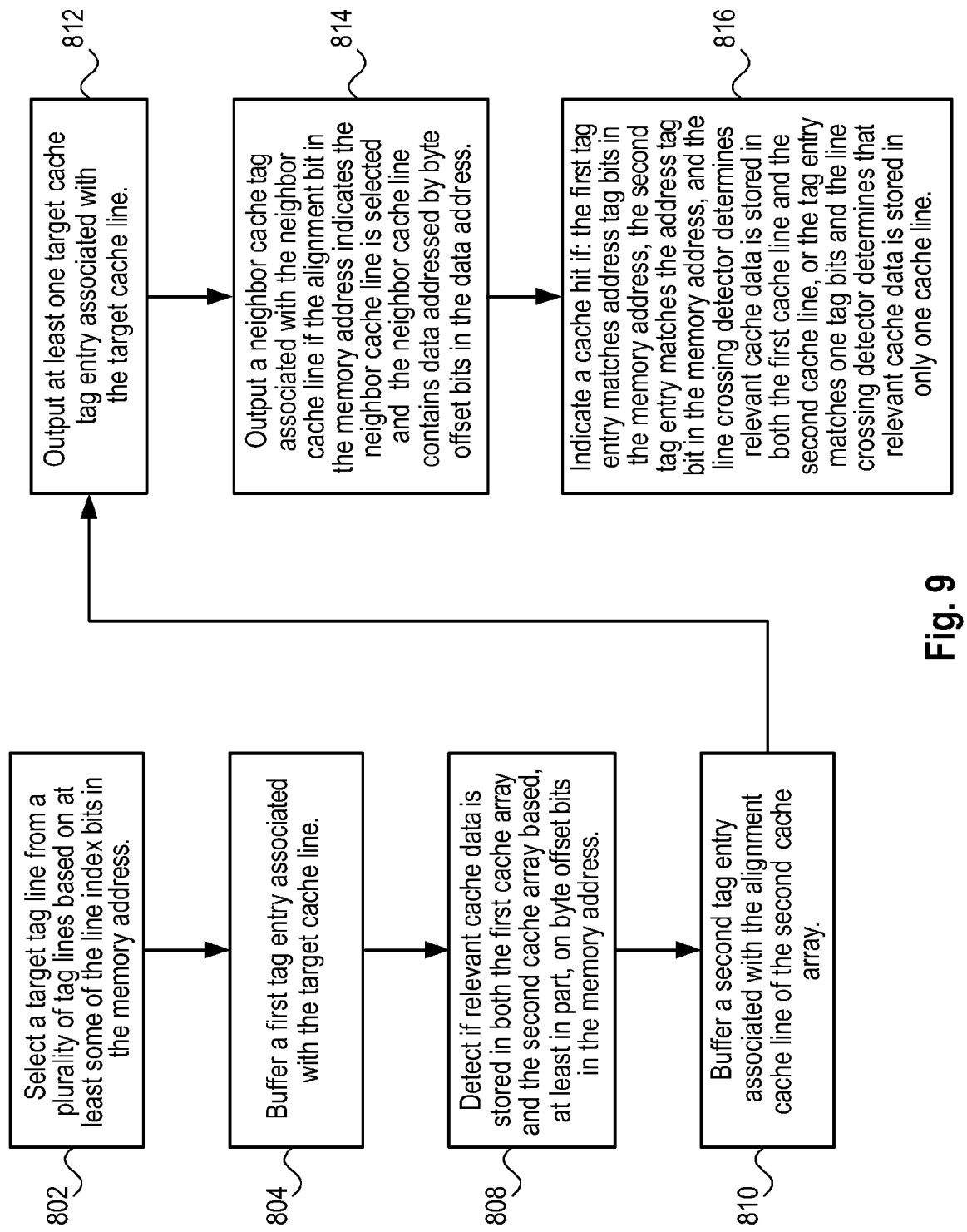

Turning to FIG. 9, additional example steps are presented for operating the cache memory device contemplated by the present invention.

At selecting operation 902, a target tag line is selected from a plurality of tag lines based on at least some of the line index bits in the memory address. Next, at buffering operation 904, a first tag entry associated with the target cache line of the first cache array is buffered. Next, detecting operation 906 detects if relevant cache data straddles two cache lines based, at least in part, on byte offset bits in the memory address. If cache line straddle is detected, buffering operation 906 additionally buffers a second tag entry associated with the second cache line.

An outputting operation 912 outputs at least one target cache tag entry associated with the target cache line. Furthermore, at outputting operation 914, a neighbor cache tag associated with the neighbor cache line is output if the alignment bit in the memory address indicates the neighbor cache line is selected and the neighbor cache line contains data addressed by byte offset bits in the data address.

Next, at indicating operation 916, a cache hit is indicated if: the first tag entry matches address tag bits in the memory address, the second tag entry matches the address tag bit in the memory address, and the line crossing detector determines relevant cache data is stored in both the first cache line and the second cache line. It is noted that this operation performed when a cache line crossing is detected and is not the only time a cache hit mat occur. Other cache hits may occur that do not meet the conditions in indicating operation 816. For example, a cache hit occurs if requested data is contained only within one cache line, and the address tag of that cache line matched the address tag bit.

Figure 10:
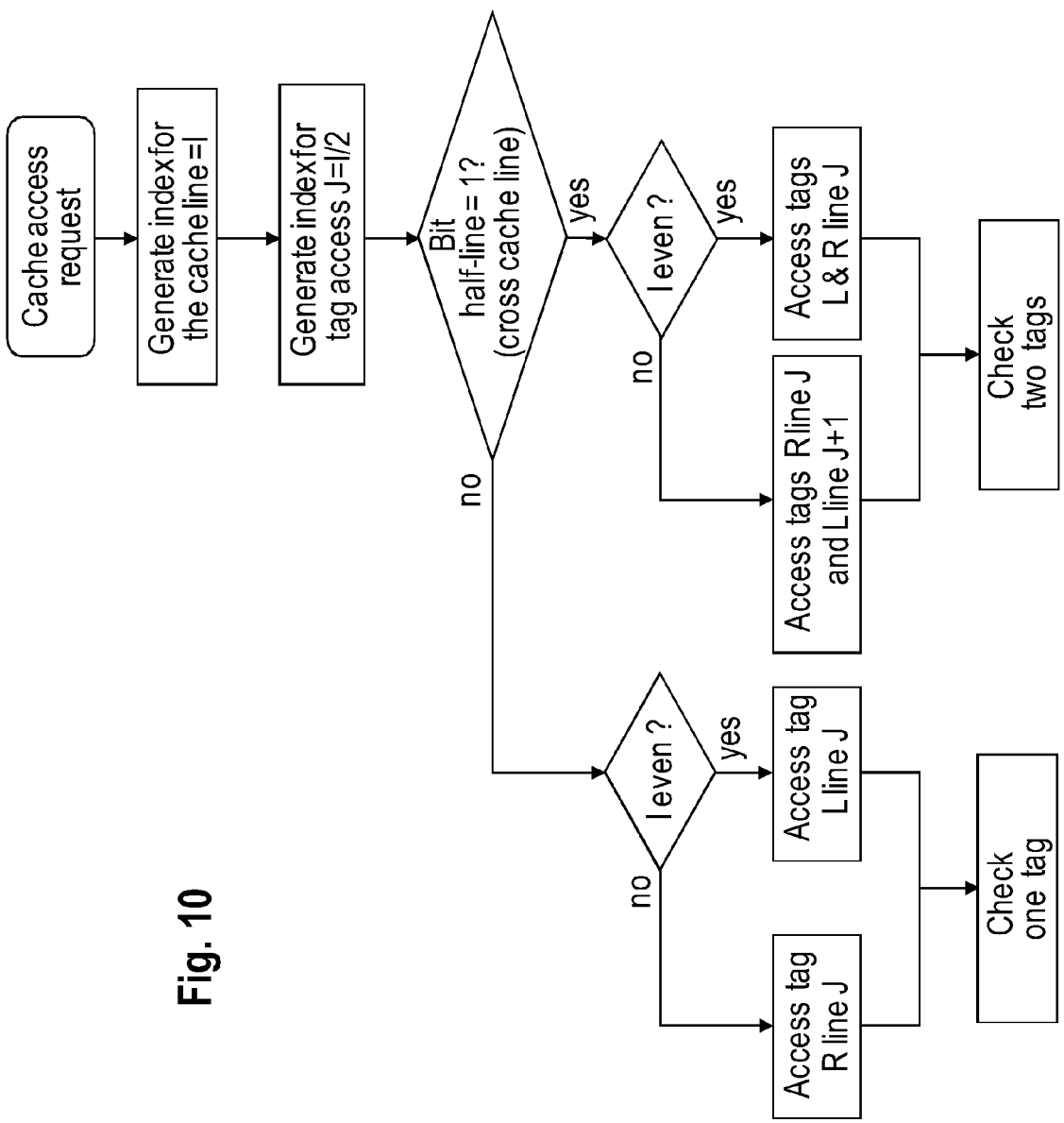
Figure 11:
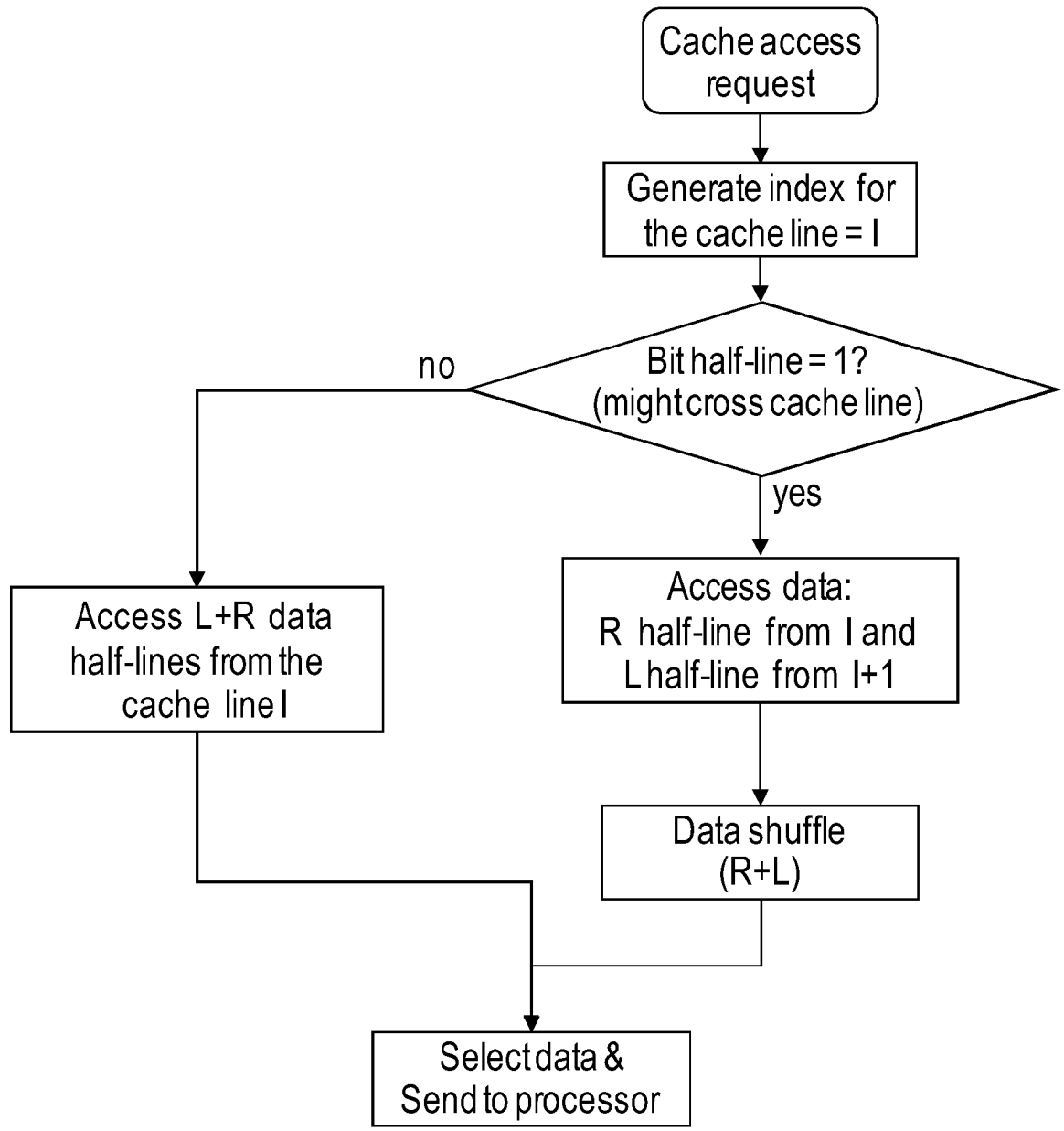
Figure 12:
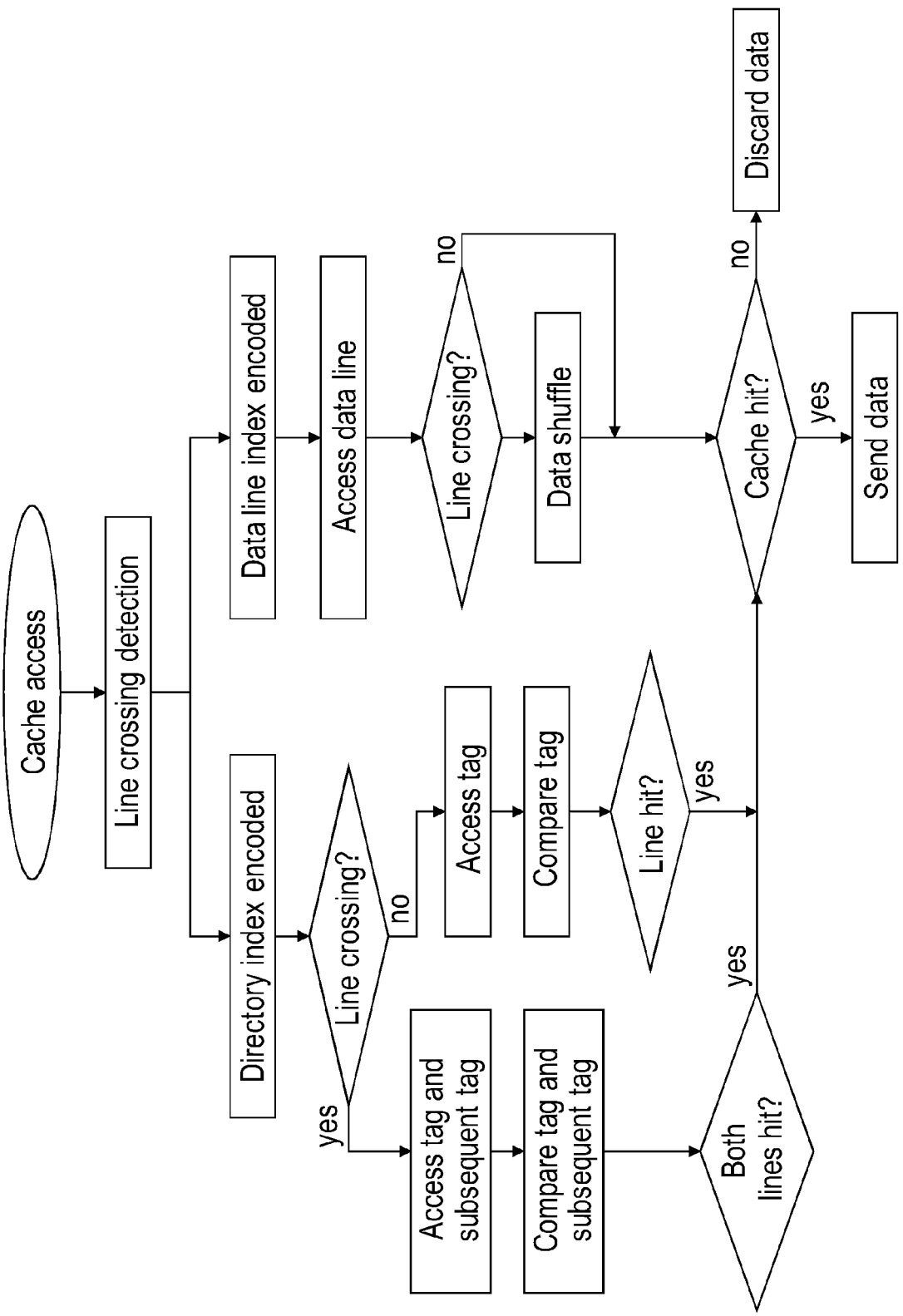

For example, FIG. 10 shows more detailed operations for cache tag checking by an embodiment of the present invention. Furthermore, FIG. 11 and FIG. 12 illustrate example operations cache data access and tag checking, as contemplated by the present invention.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As discussed above, embodiments of the present invention beneficially implement hardware support for unaligned cache accesses without performance penalty. Some of near term benefits of these embodiments are increased performance gain of the vector Single Instruction, Multiple Data (SIMD) unit by reducing overhead when handling unaligned data, and reduced register pressure, as more registers are needed to merge data from two distinct loads.

While such advantages directly improve performance, even more significant are long term benefits. Support for unaligned cache access gives a foundation for programming models of the future, by enabling usage and development of not platform-specific code (for example, usage of shuffle instructions generated for the code is very platform dependent). This, as a result, enables writing more flexible code, and supports source code portability into computer systems from other platforms by eliminating need for architecture-specific coding.

While the preferred embodiments to the invention has been described, it will be understood that those skilled in the art, both now and in the future, may make various improvements and enhancements which fall within the scope of the claims which follow. For example, in the above discussion, hardware support for unaligned cache accesses is described in the context of direct mapped cache, i.e., for a set-associative cache with associatively 1. For set-associative cache, the same data and tag organization is replicated for each set. Support for set-associative cache is based on half cache lines in a way that each half line separately selects the way it hits for that half line. Based on tag match, one half line is selected. Thus, these claims should be construed to maintain the proper protection for the invention first described.

What is claimed is:

1. A cache memory device comprising:
    an address decoder configured to decode line index bits in a memory address and select a target cache line from a plurality of cache lines;
    a first cache array coupled to the address decoder, the first cache array configured to output a first cache entry associated with the target cache line;
    a second cache array coupled to the address decoder, the second cache array configured to output a second cache entry associated with an alignment cache line;
    an alignment unit coupled to the address decoder, the alignment unit configured to select either the target cache line or a neighbor cache line proximate the target cache line in the second cache array as output to the alignment cache line, selection of either the target cache line or the neighbor cache line being based on an alignment bit in the memory address; and
    a tag selector configured to output at least one target cache tag entry associated with the target cache line and, if bits in the memory address indicate a neighbor cache line is selected by the alignment unit and the neighbor cache lines contains data addressed by byte offset bits in the data address, to output a neighbor cache tag associated with the neighbor cache line.

2. The cache memory device of claim 1, wherein the neighbor cache line is the cache line associated with the memory address at the address decoder incremented by one.

3. The cache memory device of claim 1, wherein the first cache entry and the second cache entry are equal in bit width.

4. The cache memory device of claim 1, further comprising a shuffle unit coupled to the first cache array and the second cache array, the shuffle unit configured to swap bit locations of the first cache entry and the second cache entry in a shuffle buffer if the alignment bit in the memory address indicates the neighbor cache line is selected by the alignment unit.

5. The cache memory device of claim 4, further comprising a word selector configured to output a portion of data stored in the shuffle buffer corresponding to byte offset bits in the memory address.

6. The cache memory device of claim 4, further comprising a line crossing detector coupled to the shuffle unit, the line crossing detector configured to determine if relevant cache data is stored in both the first cache array and the second cache array based, at least in part, on byte offset bits in the memory address.

7. The cache memory device of claim 1, further comprising:
wherein the tag selector is further configured to output up to two neighbor cache tags associated with the neighbor cache lines if bits in the memory address indicate two neighbor cache lines are selected by the alignment unit and the neighbor cache lines contain data addressed by byte offset bits in the data address.

8. The cache memory device of claim 1, further comprising:
a tag decoder configured to decode at least some of the line index bits in the memory address and select a target tag line from a plurality of tag lines;
a first tag array coupled to the tag decoder, the first tag array configured to output an even tag entry associated with an even target cache line of the first and second cache arrays; and
a second tag array coupled to the tag decoder, the second tag array configured to output an odd tag entry associated with an odd cache line of the first and second cache arrays.

9. The cache memory device of claim 8, further comprising:
a line crossing detector configured to determine if relevant cache data is stored in both the even cache line and the odd cache line based, at least in part, on byte offset bits in the memory address; and
a cache hit detector coupled to the line crossing detector, the cache hit detector configured to indicate a cache hit if: the even tag entry matches address tag bits in the memory address, the odd tag entry matches the address tag bit in the memory address, and the line crossing detector determines relevant cache data is stored in both the even and odd cache lines.

10. The cache memory device of claim 1, wherein the alignment unit includes a plurality of multiplexers receiving a first cache line associated with a first address and a second cache line associated with a second address.

11. A method for operating a cache memory device, the method comprising:
selecting a target cache line from a plurality of cache lines based on decoded line index bits in a memory address;
retrieving a first cache entry associated with the target cache line from a first cache array;
selecting either the target cache line or a neighbor cache line proximate the target cache line from the plurality of cache lines as an alignment cache line output based on decoded line index bits in a memory address, selection of either the target cache line or the neighbor cache line being based on an alignment bit in the memory address;
retrieving a second cache entry associated with the alignment cache line from a second cache array;
outputting at least one target cache tag entry associated with the target cache line; and
if bits in the memory address indicate a neighbor cache line is selected and the neighbor cache line contains data addressed by byte offset bits in the data address, outputting a neighbor cache tag associated with the neighbor cache line.

12. The method of claim 11, wherein the first cache entry and the second cache entry are equal in bit width.

13. The method of claim 11, further comprising swapping bit locations of the first cache entry and the second cache entry in a shuffle buffer if the alignment bit in the memory address indicates the neighbor cache line is selected.

14. The method of claim 13, further comprising outputting a portion of data stored in the shuffle buffer corresponding to byte offset bits in the memory address.

15. The method of claim 13, further comprising determining if relevant cache data is stored in both the first cache array and the second cache array based, at least in part, on byte offset bits in the memory address.

16. The method of claim 11, further comprising:
outputting a neighbor cache tag associated with the neighbor cache line if the alignment bit in the memory address indicates two neighbor cache lines are selected and the neighbor cache lines contain data addressed by byte offset bits in the data address.

17. The method of claim 11, further comprising:
selecting a target tag line from a plurality of tag lines based on at least some of the line index bits in the memory address;
buffering an even tag entry associated with the even target cache line; and
buffering an odd tag entry associated with the odd cache line.

18. The method of claim 17, further comprising:
detecting if relevant cache data is stored in both even and odd cache line based, at least in part, on byte offset bits in the memory address; and
indicating a cache hit if: the even tag entry matches address tag bits in the memory address, the odd tag entry matches the address tag bit in the memory address, and the line crossing detector determines relevant cache data is stored in both the even and the odd cache lines.

19. A system for operating a cache memory device, the system comprising:
means for selecting a target cache line from a plurality of cache lines based on decoded line index bits in a memory address;
means for retrieving a first cache entry associated with the target cache line from a first cache array;
means for selecting either the target cache line or a neighbor cache line proximate the target cache line from the plurality of cache lines as an alignment cache line output based on decoded line index bits in a memory address, selection of either the target cache line or the neighbor cache line being based on an alignment bit in the memory address;
means for retrieving a second cache entry associated with the alignment cache line from a second cache array;
means for outputting at least one target cache tag entry associated with the target cache line; and
means for outputting a neighbor cache tag associated with the neighbor cache line if bits in the memory address indicate a neighbor cache line is selected and the neighbor cache line contains data addressed by byte offset bits in the data address.

20. The system of claim 19, further comprising means for swapping bit locations of the first cache entry and the second cache entry in a shuffle buffer if the alignment bit in the memory address indicates the neighbor cache line is selected.

21. The system of claim 20, further comprising means for outputting a portion of data stored in the shuffle buffer corresponding to byte offset bits in the memory address.

22. The system of claim 20, further comprising means for determining if relevant cache data is stored in both the first cache array and the second cache array based, at least in part, on byte offset bits in the memory address.

23. The system of claim 19, further comprising:
means for outputting a neighbor cache tag associated with the neighbor cache line if the alignment bit in the memory address indicates two neighbor cache lines are selected and the neighbor cache lines contain data addressed by byte offset bits in the data address.

24. The system of claim 19, further comprising:
means for selecting a target tag line from a plurality of tag lines based on at least some of the line index bits in the memory address;
means for buffering an even tag entry associated with the even target cache line; and
means for buffering an odd tag entry associated with the odd cache line.

25. The system of claim 24, further comprising:
means for detecting if relevant cache data is stored in both even and odd cache line based, at least in part, on byte offset bits in the memory address; and
means for indicating a cache hit if: the even tag entry matches address tag bits in the memory address, the odd tag entry matches the address tag bit in the memory address, and the line crossing detector determines relevant cache data is stored in both the even and the odd cache lines.

* * * * *